Feb. 7, 1956  S. S. LANIER, JR  2,733,806
EXTENSIBLE CONVEYER
Filed Jan. 15, 1951  9 Sheets-Sheet 1

INVENTOR.
STERLING S. LANIER, JR.
BY
Jennings V Carter
ATTORNEYS

Feb. 7, 1956 S. S. LANIER, JR 2,733,806
EXTENSIBLE CONVEYER
Filed Jan. 15, 1951 9 Sheets-Sheet 3

INVENTOR.
STERLING S. LANIER, JR.
BY
Jennings & Carter
ATTORNEYS

Feb. 7, 1956 S. S. LANIER, JR 2,733,806
EXTENSIBLE CONVEYER
Filed Jan. 15, 1951 9 Sheets-Sheet 4

INVENTOR.
STERLING S. LANIER, JR.
BY
Jennings & Carter
ATTORNEYS

INVENTOR.
STERLING S. LANIER, JR.
BY
ATTORNEYS

Feb. 7, 1956  S. S. LANIER, JR  2,733,806
EXTENSIBLE CONVEYER
Filed Jan. 15, 1951  9 Sheets-Sheet 9

INVENTOR.
STERLING S. LANIER, JR.
BY
Jennings & Carter
ATTORNEYS

United States Patent Office 2,733,806
Patented Feb. 7, 1956

2,733,806

EXTENSIBLE CONVEYER

Sterling S. Lanier, Jr., Nortonville, Ky.

Application January 15, 1951, Serial No. 206,036

14 Claims. (Cl. 198—139)

This invention relates to a belt conveyor system, and particularly to such a system for use in mine operations, and has for an object the provision of a mobile extensible conveyor which shall be adapted to follow a continuous loading machine such as is now employed in coal mines.

A further object of my invention is to provide an extensible belt conveyor system which shall include a conveying section adapted to follow a continuous miner type of coal loading machine, plus a take up section for supplying additional belt to the conveying section and which shall be so mounted as to be capable of being moved by its own power from one location to another with a minimum loss of time.

A still further object of my invention is to provide a belt conveyor system which shall be adapted to follow a continuous type of coal loading machine and in which the loading machine shall continuously discharge coal onto the conveyor without interruption caused by extending the transportation means, thus enabling the loader to maintain the maximum production while reducing shut down time to an absolute minimum.

A still further object of my invention is to provide an extensible conveyor system which shall include a conveying section, a take-up section, and transfer apparatus for transferring the conveying belt from the conveying section to the take-up section and which shall provide surplus belt and idler carriers which may be readily positioned to provide additional conveying section at will, or which may be taken out of the conveying section.

Apparatus embodying features of my invention is illustrated in the accompanying drawings, forming a part of this application, in which.

Figures 1, 2, 4, 5:
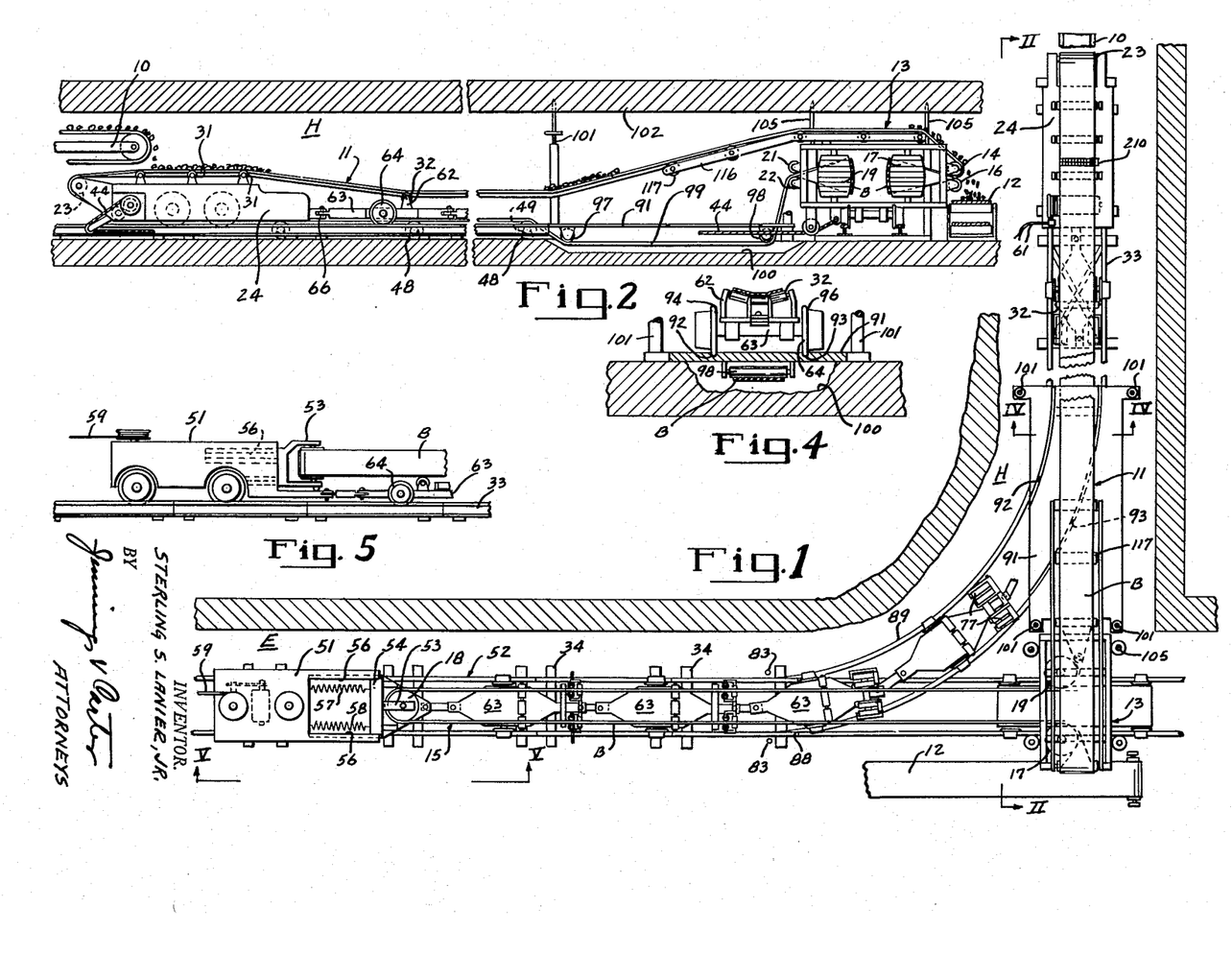
Fig. 1 is a plan view showing a conveying system constructed in accordance with my invention and located in a mine.
Fig. 2 is a sectional view taken along the line II—II of Fig. 1.
Fig. 4 is a sectional view taken along the line IV—IV of Fig. 1, drawn to a larger scale, and showing an idler support on the turnout plate.
Fig. 5 is a side elevational view looking in the direction of the arrows V—V of Fig. 1.
Figure 3:
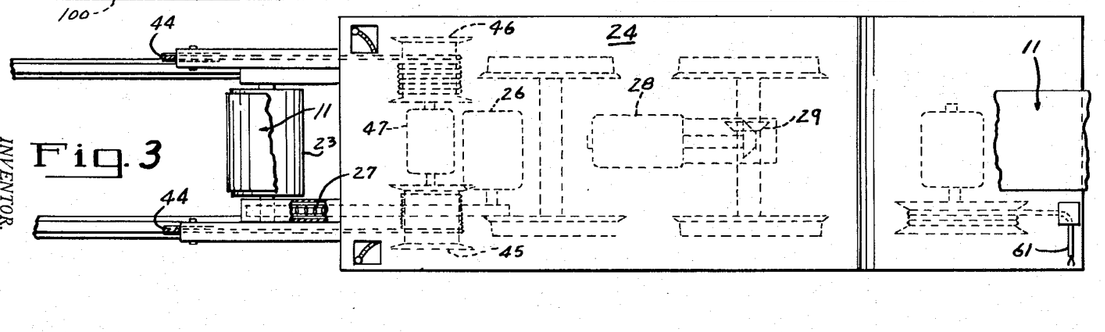
Fig. 3 is a detail plan view of a locomotive employed with my invention.

Referring now to the drawings for a better understanding of my invention, I show in Figs. 1 and 2 a mine working including an entry E and a heading H. Located in the end of the heading H is a continuous type loader 10. As this forms no part of my present invention, only a fragment is shown. The continuous loader 10 discharges coal onto the conveying section 11 of an extensible belt conveyor which delivers the coal onto a second conveyor 12 which is disposed to convey the coal, or ore out of the mine. The belt B employed with my improved conveyer may, as is well understood be of any suitable material usually employed for the purpose such as rubber composition or steel.

The extensible conveyor embodies the conveying section 11, a transfer section 13, and a take up section 15. As before pointed out, the conveying section 11 receives coal from the continuous loader 10. After delivering it to the second conveyor 12, the belt B turns downward between a pair of snubbing rollers 14 and 16, thence around a vertically disposed transfer roller, or pulley, 17, where the flight is turned from horizontal to vertical, thence passes around a vertical pulley 18 in the take up section 15, thence around a second transfer vertically disposed pulley 19 and thence through a pair of snubbing rollers 21 and 22 where the flight is turned back to horizontal. The conveying belt B then passes around the head pulley 23 of the conveying system back to the conveying section 11. My invention is concerned particularly with the means for bringing about the extension of the conveying section, and the take up means in the take up section, together with the means for supporting the conveyor belt, whereby the system shall be flexible, easily manipulated, and adapted to follow the mining and loading operations in the mine with a minimum of stoppage.

Figure 6:
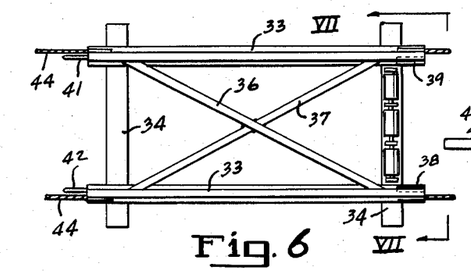
Fig. 6 is a detail plan view showing a section of the track employed with one form of my invention.
Figure 7:
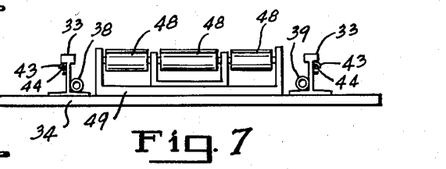
Fig. 7 is an end elevational view looking in the direction of the arrows VII—VII of Fig. 6.

Mounted at the head of the conveying section 11 is an electrically powered locomotive 24. The locomotive 24 has mounted thereon a motor 26 which drives the head pulley 23 by any suitable means such as a chain 27 and suitable sprockets. The locomotive 24 is propelled by a motor 28 through suitable gearing indicated diagrammatically in dotted lines at 29 whereby the conveying section 11 may be caused to follow the continuous loader 10. The conveying section 11 of the belt passes over a suitable number of idler rollers 31 which may be mounted on top of the locomotive 24, thence over a suitable number of troughing idlers 32 which are supported in the manner to be described later in detail herein. The belt then passes to the transfer section 13. The locomotive 24 may be mounted upon rails 33 of a jointed railroad track which may be constructed as shown in Fig. 6. The track is comprised of short sections as shown in Figs. 6 and 7 wherein the rails 33 are joined by cross ties 34 and diagonal braces 36 and 37. At one end of each of the sections are sleeves 38 and 39 which are adapted to receive pins 41 and 42 of an adjacent section, thereby to join together and line up the several sections. In addition, each of the rails 33 carries an overhanging hook 43 which is adapted to receive a cable 44. The cable 44 is wound about drums 45 and 46 and has its opposite ends secured to a suitable stationary member, such as a part of the transfer section 13. The drums 45 and 46 are driven by means of a motor 47. It will be seen that when the cable is tightened, the rail sections will be drawn into alignment. Each of the track sections carries idler pulleys 48 mounted in a suitable bracket 49 on one of the cross ties 34. The idler pulleys 48 support the lower reach 99 of the conveyor belt in the conveying section 11.

The take up section 15 of the conveying system is operated by a locomotive 51 which is electrically propelled, in a manner similar to the locomotive 24. The locomotive 51 is mounted upon a sectional track 52 similar in all respects to the track 33 upon which the locomotive 24 is mounted. Extending rearwardly from the locomotive 51 is a heavy bracket 53 in which the tail pulley 18 of the take up section is mounted. The bracket 53 is mounted on a cross head 54 working in guides 56 in the rear of the locomotive and is connected to the locomotive by means of heavy springs 57 and 58. Other means for maintaining tension on the belt may be employed. Dual electric control cables 59 and 61 are provided whereby the two locomotives 24 and 51 may be operated in unison, in a manner well understood, to maintain the proper tension in the conveyer belt B. As the continuous loader 10 moves forward, the locomotive 24 follows it and the conveyer belt B is pulled through the transfer section 13, followed by the reserve portion of belt in the take up section 15 to provide more conveyer length.

The idlers 32 for the conveying section 11 of the conveyer belt B are mounted in brackets 62 on an idler carriage 63 having flanged wheels 64 mounted on the rails 33. The carriage 63 is coupled to the locomotive 24 by a clevis and pin connection 66, as shown in Fig. 2 of the drawing. Thus, the idlers 32 follow the movements of the locomotive 24 as it elongates the conveying belt section 11.

Figure 9:
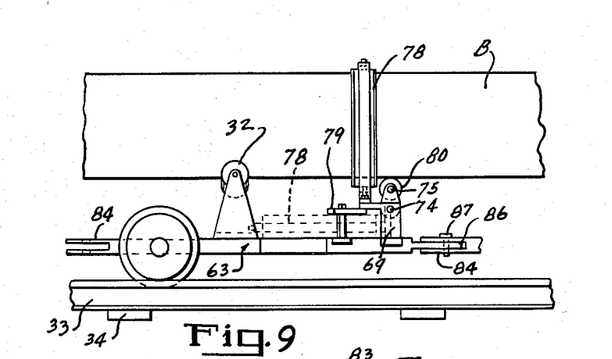
Fig. 9 is a side elevational view showing the idler support.
Figure 10:
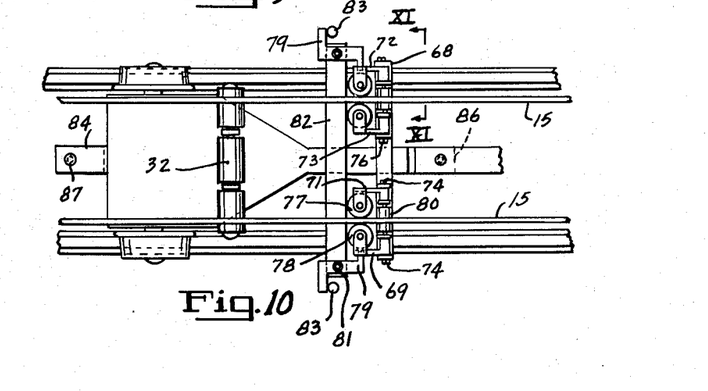
Fig. 10 is a plan view of the apparatus shown in Fig. 9.
Figure 11:
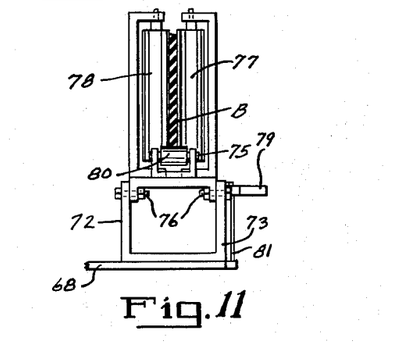
Fig. 11 is a detail sectional view taken along the line XI—XI of Fig. 10.

In the take up section 15 of the conveyer, where the belt B is turned from horizontal to vertical, a different type of idler is employed as illustrated in Figs. 9, 10 and 11 of the drawings. In the forward ends of the carriage 63 there is mounted a cross piece 68 upon which brackets 69 and 71 are pivotally mounted on one side, and brackets 72 and 73 are mounted on the other side, by means of pivot bolts 74 and 76. Mounted in the brackets 69 and 71, laterally of the pivot bolt 74 are a pair of vertically disposed rollers 77 and 78 which are held in a vertical position by means of a trip 79 which is pivotally connected at 81 to a second cross piece 82 mounted on the carriage 63. As shown in Fig. 10, the belt B in the take up section 15 passes between the rollers 77 and 78 and is held in an upright position thereby. A third, short horizontal roller 80 is mounted on a bolt 75 against which the lower edge of the belt runs. As may be seen in Fig. 10, the trip member 79 is Z shaped when viewed in plan and is adapted to engage a trip post 83 mounted alongside the track whereby it is turned out from under the brackets 69. This causes the vertical idlers 77 and 78 to assume a horizontal position as indicated in dotted lines in Fig. 9.

The trip posts 83 are located along the track in a manner to be described later, in locations where it is desired to allow the vertical idlers to fall down.

The support for the vertical idlers on the opposite side of the idler carriage is the same as that described and need not be repeated. Each of the carriages has a clevis 84 at one end and a tongue 86 at the other end adapted to enter into the clevis 84 of an adjacent carriage and be secured thereto by means of a coupling pin 87.

By reference to Fig. 1 of the drawing, it will be seen that there is provided a switch 88 in the track 52 which diverts the carriages 63 over rails 89 leading toward the rails 33 upon which the locomotive 24 and the conveying section of the conveyor belt B operates. The posts 83 for tripping the vertical idlers, described above, are located just in advance of the switch 88 whereby the vertical idlers are tripped and caused to lie down where the carriages 63 start around the curved track 89.

Between the track 33 and the transfer section 13 of the apparatus, is a heavy, elongated plate 91, having grooves 92 and 93, therein for receiving the flanges 94 and 96 of the idler carriages 63. The grooves 92 and 93 lie directly in front of the rails 33 at one end and connect to the rails 89 at the opposite end. Mounted on the underside of the plate 91 are rollers 97 and 98 for the return reach 99 of the conveyor belt which passes from the snubbing rollers 21 and 22 beneath the plate 91 and under the rollers 97 and 98 and thence up over the return idler rollers 48 of the adjacent track section. The bottom of the mine is dug out as shown at 100 to allow for this movement of the conveyor belt. The plate 91 is firmly held to its position in the heading H by means of roof jacks 101 which bear against the plate at the bottom and the roof of the mine 102 at the top, as shown in Fig. 2. One of these jacks 101 is placed at each of the corners of the plate 91.

Figure 8:
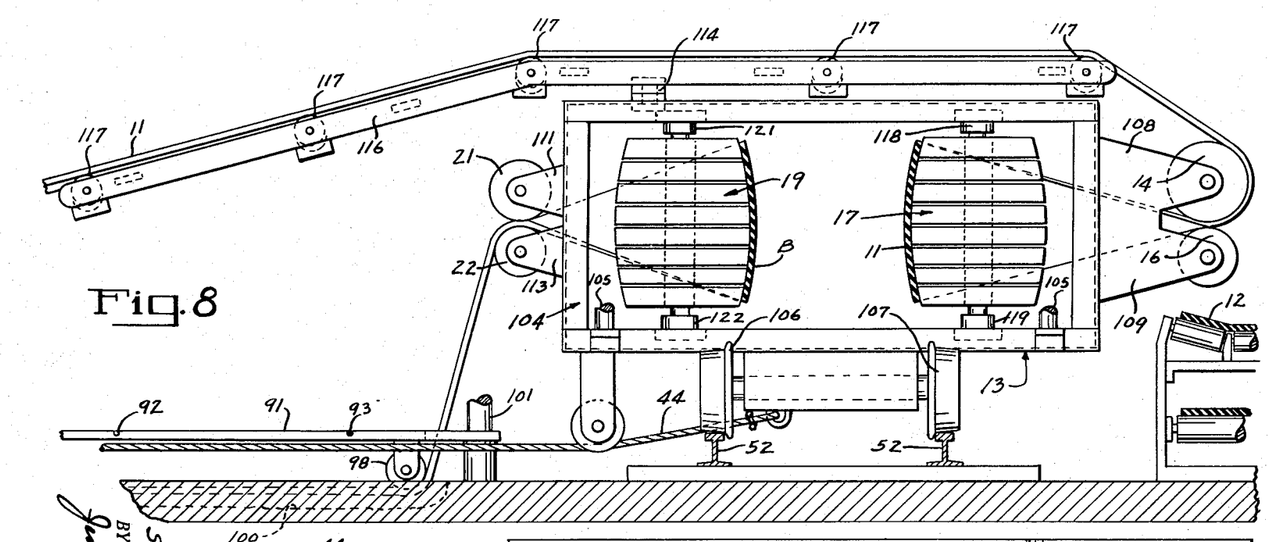
Fig. 8 is an enlarged detail view of the transfer section of the conveyor.

The transfer section 13 of my improved apparatus is best illustrated in Fig. 8 of the drawing. It comprises a rectangular frame 104 mounted on flanged wheels 106 and 107 which run upon the rails 52. When in operation, it is held firmly in place by means of a suitable number of roof jacks 105 which engage the frame at their lower ends and the roof of the mine at their upper ends. The snubbing rollers 14 and 16 are carried in brackets 108 and 109 mounted on one side of the frame and the return snubbing rollers 21 and 22 are carried in brackets 111 and 113 on the opposite side of the frame.

Pivotally mounted to rotate in a horizontal plane on top of the frame 104, at 114, is an elongated idler support frame 116, or boom, which carries a suitable number of troughing idler rollers 117 for conveying section 11 of the belt. Whenever it is desired to move the apparatus from one heading in the mine to another, the frame 116 may be rotated about its pivot point to lie parallel with the entry or other working where it will not engage the sides.

Also suitably mounted in bearings 118 and 119 is the outgoing transfer roller 17. On the other side of the frame, in bearings 121 and 122, is mounted the return transfer roller 19. Preferably, the pulleys 17 and 19 are somewhat barrel shaped; that is, each is of greater diameter mid-way its ends than it is at the ends. This is for the reason that when the conveyor belt is turned through an angle of 90°, the outer portions thereof are at a longer distance from the bite between the snubbing rolls 14 and 16 than are the central portions as will be seen in Fig. 8 of the drawing. Accordingly, I prefer to make the pulleys 17 and 19 of progressively greater diameter from the ends toward the middle to compensate for this difference in distance.

Figure 12:
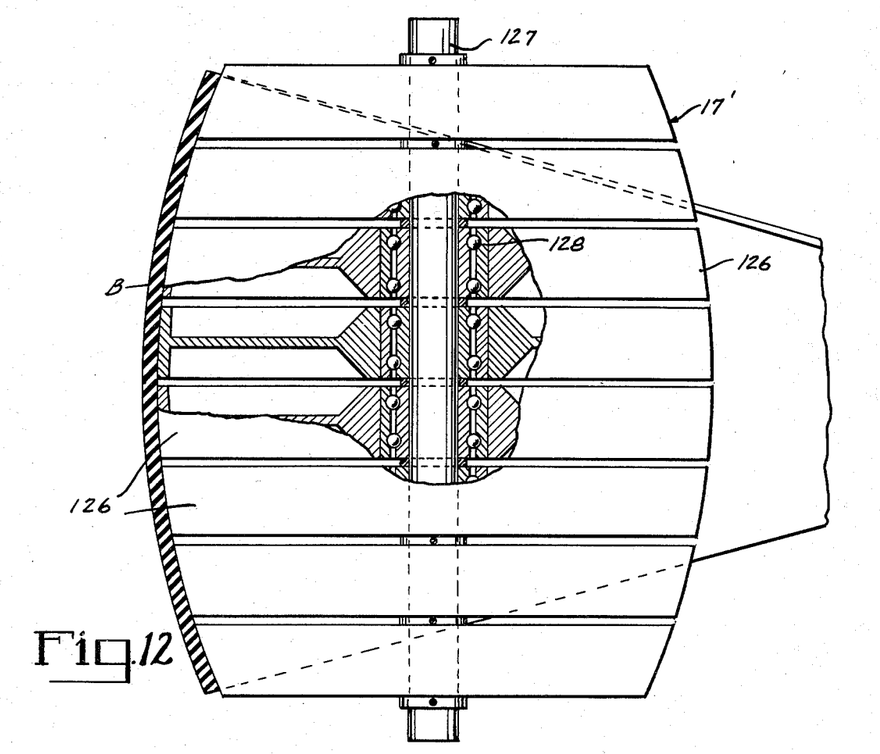
Fig. 12 is an elevational view with parts broken away and in section showing one of the barrel type pulleys employed in the transfer section.
Figure 13:
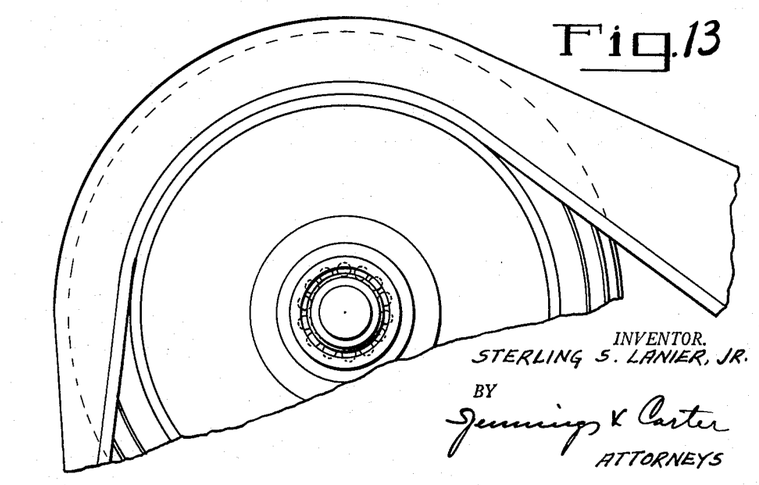
Fig. 13 is a plan view of the pulley shown in Fig. 12.
Figure 14:
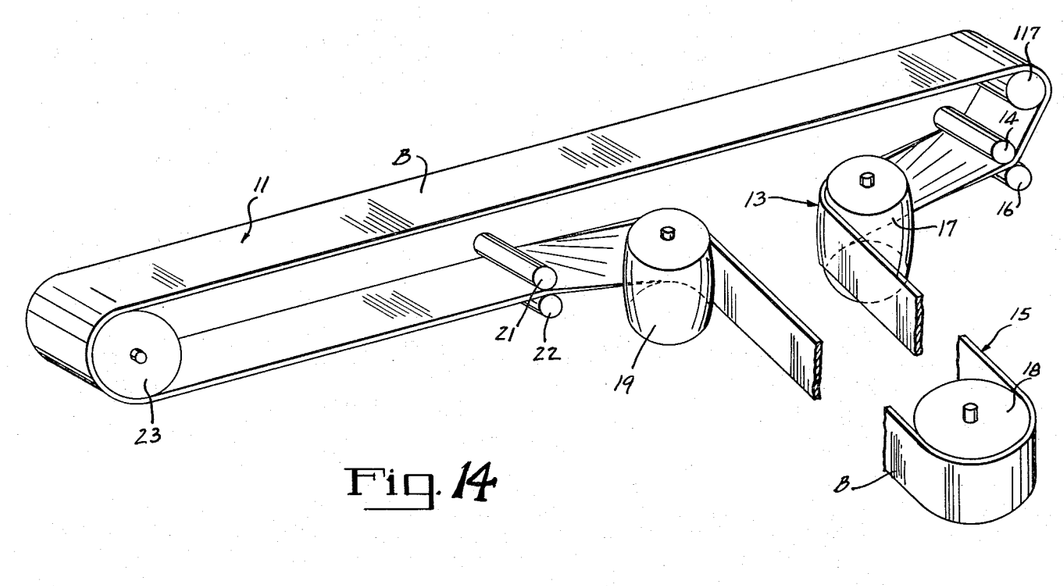
Fig. 14 is a diagrammatic perspective view illustrating the operation of my invention.

A further refinement of the construction of the pulleys 17 and 19 is shown in Figs. 12 and 13 of the drawings wherein I show a pulley 17' which is made up of separate, disc like sections 126, which are of successively larger diameters from the ends of the pulley progressively toward the middle. In addition, I mount each of the sections 126 to rotate freely upon a shaft 127, independently of adjacent sections, and provide friction reducing bearings 128 for each of the sections. By this means, there is a minimum of drag upon the belt due to difference in rate of movement of a portion of the belt and the adjacent portions of its pulley.

Figures 15, 16, 16A, 17:
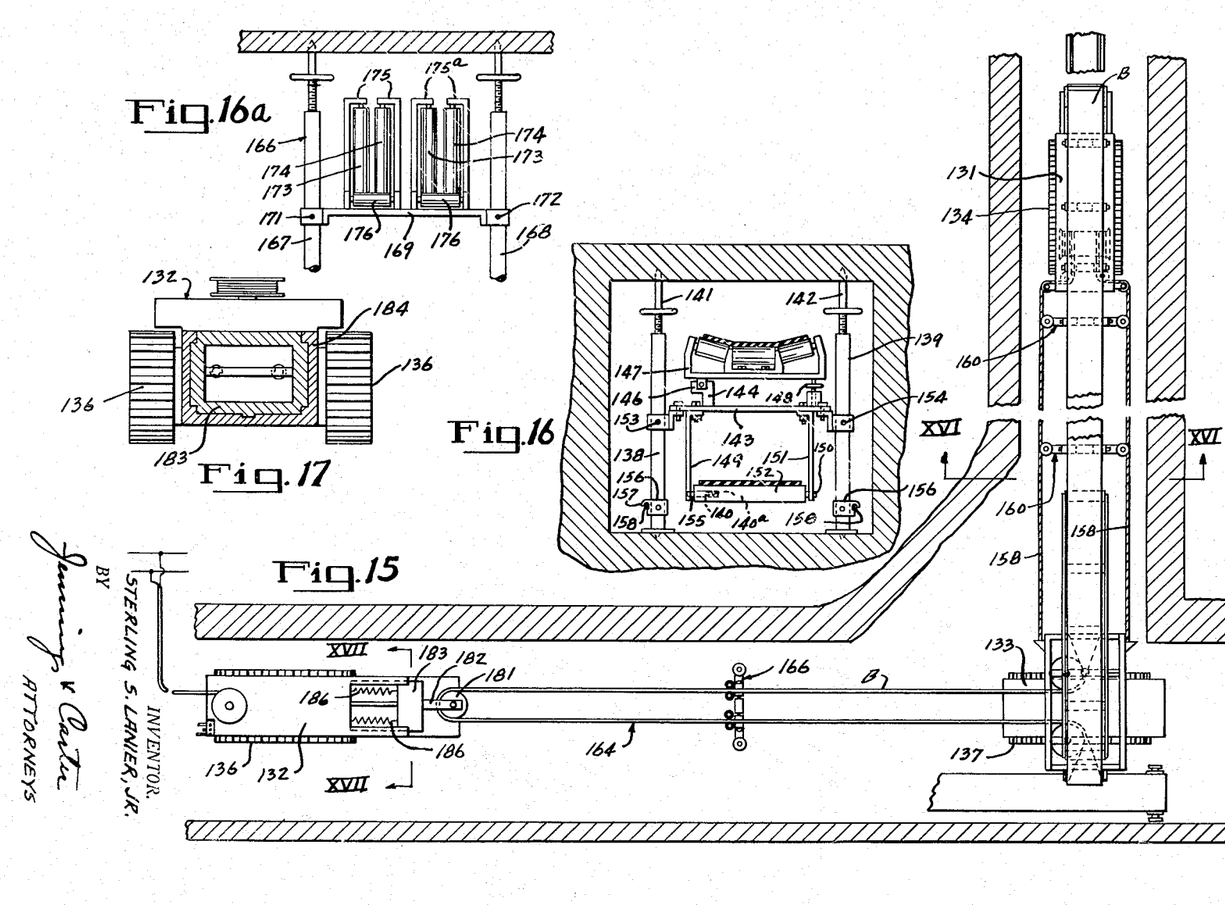
Fig. 15 is a plan view showing a modified form of my invention.
Fig. 16 is a sectional view taken along the lineXVI—XVI of Fig. 15 and drawn to a larger scale.
Fig. 16a is an elevational view showing a modified form of idler support adapted for use in the take-up section of the apparatus.
Fig. 17 is a sectional view taken along the line XVII—XVII of Fig. 15.

In Figs. 15 to 17 inclusive, I show a modified form of my invention in which, I employ a head locomotive 131, a tail locomotive 132, and a transfer section 133 all of which are similar in construction and operation to the units 24, 51, and the transfer section 13 except that in accordance with this modification I do not employ tracks upon which the locomotives and the transfer units are adapted to move. The locomotive 131 is provided with a continuous track 134; the locomotive 132 with a continuous track 136 and the transfer unit 133 with a continuous track 137 whereby they may be moved from place to place. Rubber tired wheels may be substituted for the continuous track shown, the intention being to provide self propelled units capable of moving within the restricted space available in a mine.

Instead of idler supports mounted on carriages, in this modification I provide idler supports comprising uprights 138 and 139 which rest upon the bottom of the mine and are secured to the top by means of screw roof jacks 141 and 142. A vertically adjustable cross brace 143 joins the uprights 138 and 139. Mounted on the cross brace 143 is a bracket 144. Pivotally mounted at one end of the bracket 144 is a troughing idler support 147. The opposite end of the troughing idler support is supported by means of a screw jack 148 which rests on the cross brace 143 and which serves to level the troughing idler support 147.

Suspended from the cross member 143 are brackets 149 and 151 which support a return idler 152. The cross brace 143 may be raised and lowered on the uprights 138 and 139 and be secured in adjusted position by means of set screws 153 and 154. By this means the elevation of the idlers may be adjusted to suit conditions in the mine.

The lower idler roller 152 is provided with a pin 150 at one end thereof which is journalled in the bracket 151. The bracket 149 carries a fixed pin 155 which fits in a recess 140 in the roller 152 which recess has a spring 140a mounted therein, whereby the roller 152 may be readily removed and replaced.

Each of the uprights 138 and 139 is provided with a bracket 156 near its lower end which carries a downturned hook 157 for receiving an aligning cable 158. As shown in Fig. 15, I employ a plurality of idler carrying units 160 constructed in the manner just described and which may be aligned with the transfer unit 133 by means of the cables 158 operated from the head locomotive 131 and secured to the transfer unit 133 as in the modification previously described. When once brought into alignment, the uprights 138 and 139 are secured by means of the screw jacks as already described.

The take-up section of the conveyer belt in this modification, indicated by the numeral 164, is supported by one or more idler support units 166 each comprised of a pair of upright members 167 and 168, joined by a cross brace 169 which is vertically adjustable on the uprights and is held in adjusted position by means of set screws 171 and 172. Inasmuch as the conveyor belt in this section runs in a vertical plane, I provide vertically disposed idlers 173 and 174, mounted to rotate in brackets 175 and 175a on the cross brace 169, and small horizontal idlers 176 also mounted for rotation on the cross brace 169 for supporting the lower edge of the belt. Otherwise, the idler supports 166 are constructed in all respects similar to the supports 160 already described.

The take-up section 164 of the conveyer belt passes around a tail pulley 181 mounted to rotate in a bracket 182 carried by a cross head 183 which is slidably mounted in guides 184 in the tail locomotive 132. The cross head 183 is biased rearwardly by means of springs 186 or by other suitable means whereby the proper tension is maintained on the belt at all times.

Figure 18:
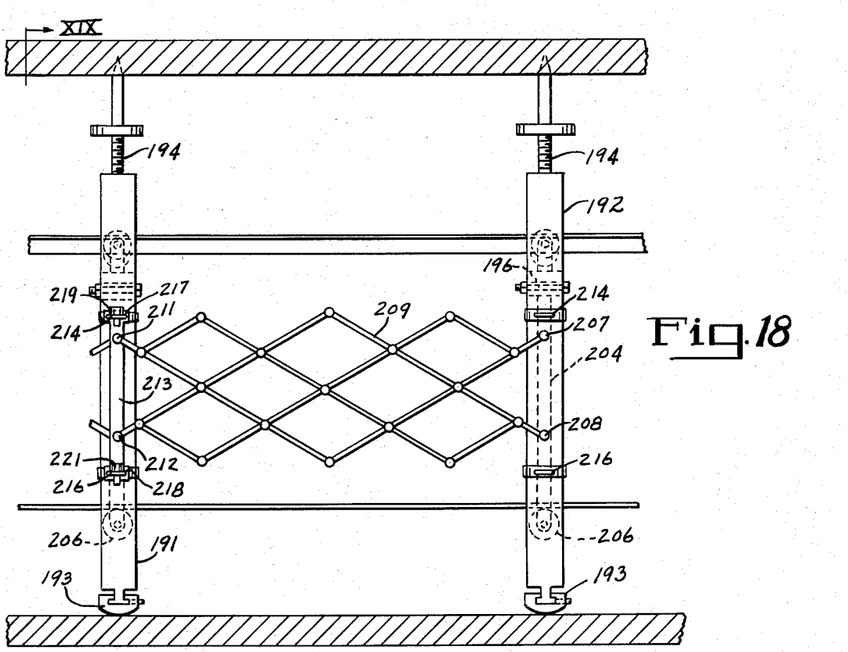
Fig. 18 is a side elevational view with parts broken away and in section showing a modified form of idler support.
Figure 19:
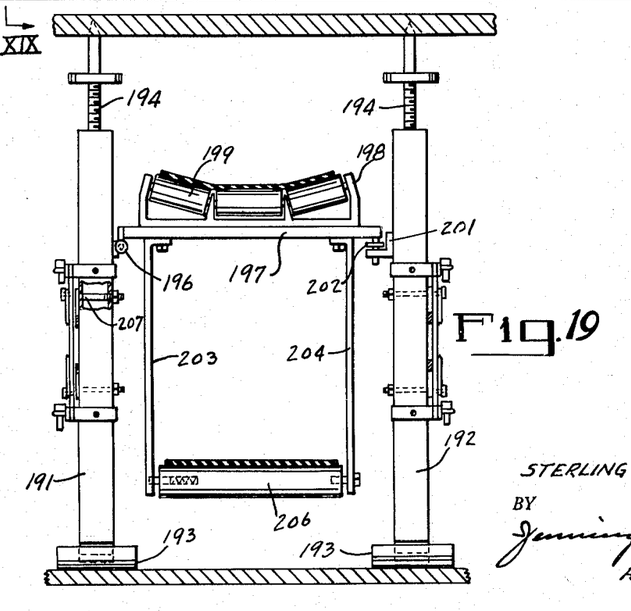
Fig. 19 is an elevational view, partly in section, looking in the direction of the arrows XIX—XIX of Fig. 18.

In Figs. 18 and 19 I show a further modified form of idler support which provides a more sturdy lateral support for the conveying belt as well as great flexibility in accommodating the belt when being extended or taken up. In accordance with this modification, I provide upright members 191 and 192, on the bottom of each of which is a sliding shoe 193. The upper ends are each provided with a screw jack 194. Pivotally connected to the upright member 191, at 196, is a cross member 197 on which is mounted a bracket 198 for supporting a set of troughing idlers 199. The opposite end of the cross member 197 is supported from a bracket 201 mounted on the upright member 192. A screw jack 202 interposed between the ends of the member 197 and the bracket 201 serves to level the cross member 197. Suspended from the cross member 197 are brackets 203 and 204 between which is removably supported a return idler 206. The return idler 206 is constructed and supported in the same manner as the return idler 152 already described.

Pivotally connected to each of the upright members 191 at 207 and 208 is a folding gate, or lazy tong member 209. The opposite end of the gate 209 is pivotally connected at 211 and 212 to a vertical bar 213. Also mounted on each of the upright members 191 are staples 214 and 216 which are adapted to enter openings 217 and 218 in the upright member 213 and receive pins 219 and 221 for securing that end of the gate 209.

With the construction herein shown and described, it will be seen that the vertical members 191 and 192 may be moved longitudinally of the belt, toward or away from adjacent vertical members to provide the necessary support for the conveying belt, and be secured in adjusted position. It will also be seen that it is easy to remove a set of idler supports by removing the cross members 197 and the return idler 206. Thus, the proper number of idlers may be readily provided for any operating conditions.

From the foregoing description, the operation of my improved conveying system will be readily understood. As the continuous loader 10 advances up the heading H, it is necessary for the conveying section 11 to advance in order to receive the coal from the loader. Whenever it becomes necessary to extend the conveying section the necessary sections of track are provided in advance of the locomotive 24 and the locomotives 24 and 51 are energized to move in unison, the locomotive 24 advancing toward the loader and the locomotive 51 following, keeping the belt under desired tension at all times. As the movement just described continues, the take-up section of the belt passes through the transfer section 13, being turned from the vertical to the horizontal and passing through the snubbing rollers 14 and 16 and 21 and 22 to lengthen the conveying section 11 and shorten the take-up section 15 as already described. This action may continue so long as it is necessary for the locomotive 24 to be advanced in the heading H and so long as there remains any take-up portion of the conveyer belt. It will be understood however that I contemplate a conveyer belt of sufficient length for the conveying section to advance the full length of any heading being worked.

When the locomotive 24 has advanced to the required limit, and it is desired to move the apparatus to another room or heading, the locomotives 24 and 51 back out to the original starting position, at which the locomotive 24 has reached the point of switch, at grooved plate 91, where it stops, and is uncoupled from the train of idler carriages 63. The first two idler carriages, standing on grooved plate 91, and curved track 89 respectively are then uncoupled and set off the track. The roof jacks 101 are removed and plate 91 lifted on one side and the belt slipped out from under it; the plate is then dropped back in position; roof jacks on transfer section 13 released; locomotive 51 then draws all the remaining idler carriages clear of switch, while transfer section 13 is pulled behind them down track 52. Locomotive 24 simultaneously is moving around the curve 89; as the belt is still coupled, the swinging boom on transfer section 13 maintains its relative position to locomotive 24 and when locomotive 24 passes onto straight track 52, the boom has turned through 90 degrees. The entire assembly may then travel in either direction along track 52 to the next desired location, the two idler carriages recoupled in on the plate 91 and curved track 89 and the apparatus is ready to go into operation again. It should be understood that the heading turnouts or room necks have been previously driven in the original development of the entry, to such distance as to permit installation of curved track 89, plate 91 and enough of track 33 to permit locomotive 24 to assume the conveying position. In driving this development work, a shorter non-extensible, mobile conveyer, not a part of this invention, may be employed to convey the coal from the turnouts to the extensible conveyer.

The apparatus shown in Figs. 15, 16 and 17 operates in the same manner just described except that no tracks are required for the locomotives 131 and 132 nor for the transfer section 133. Also in the case of the apparatus shown in Figs. 15 to 17, the idler supports are released from their supporting positions and may be entirely removed while the apparatus is being moved from one heading to another. Otherwise, the movements are the same as those described for the rail mounted apparatus.

Figure 20:
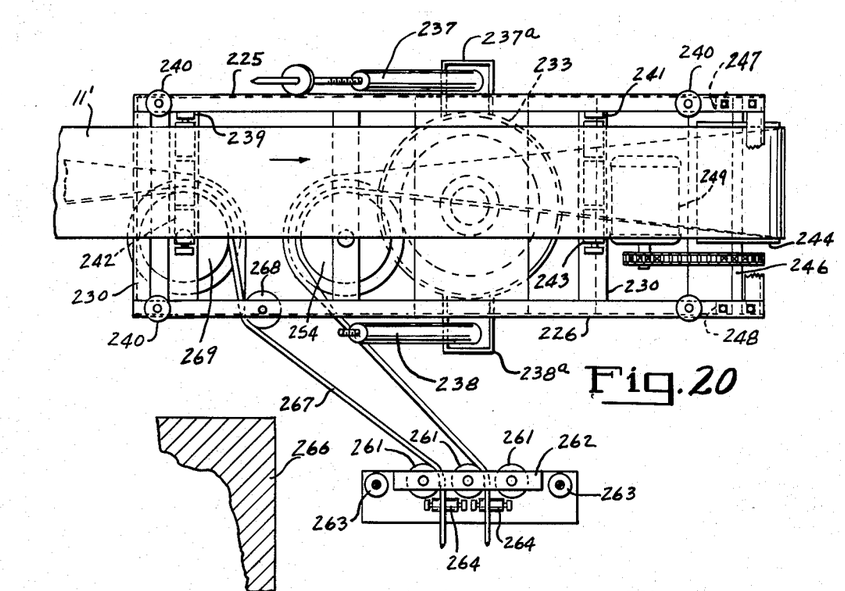
Fig. 20 is a plan view showing a modified form of a transfer section.
Figure 21:
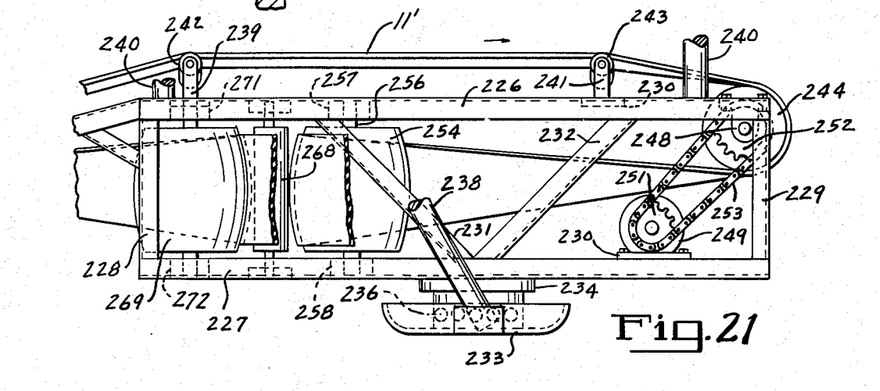
Fig. 21 is a side elevational view of the apparatus shown in Fig. 20.

In Figs. 20 and 21 I show a further modified form of transfer section which includes a rectangular frame having upper side members 225 and 226, lower side members 227, only one of which is shown, and vertical frame members 228 and 229 which join the upper and lower side frame members together. The side frame members may be joined by a suitable number of cross frame members 230 and may be suitably braced by other frame members such as 231 and 232, as is well understood.

The frame just described is supported upon a dish shaped skid base 233. A trunnion 234 is mounted on the underside of the frame and is rotatably connected to the base, preferably by means of anti-friction bearings 236, whereby the entire frame may be rotated in order to clear the sides of the mine workings when moving the section from place to place. The apparatus may be held in position by means of a suitable number of roof jacks 237 and 238. These roof jacks preferably fit in sockets 237a and 238a provided in the skid 233. Other leveling jacks 240 are provided on the upper side members 225 and 226 of the frame. It will be understood of course, that I may employ leveling jacks throughout my conveying system wherever necessary to bring idlers or pulleys into proper alignment.

Fixedly mounted upon the top of the frame are idler supports 239 and 241 upon which are mounted troughing idlers 242 and 243, over which the conveying section 11' of the conveyer belt runs.

Mounted in the upper remote end of the frame with respect to the direction of travel of the conveying belt, as indicated by the arrow, is a pulley 244 which has a shaft 246 running in suitable bearings 247 and 248. The pulley 244 may be a driven pulley and for that purpose I show a motor 249 mounted on one of the lower cross frame members 230 and which is adapted to drive the pulley 244 through sprockets 251 and 252 and a chain 253.

Mounted toward the opposite end of the frame of the apparatus, relative to the pulley 244, is a barrel shaped pulley 254 similar to the pulley 17 shown and described in Fig. 8 of the drawing. It will be noted however by comparison of Figs. 20 and 21 with Fig. 8, that the pulley 254 is spaced at a considerably greater distance from the pulley 244 than is the corresponding pulley in Fig. 8. By providing an elongated frame with a greater space, as indicated, the conveyer belt is more readily turned from a horizontal to a vertical position. The pulley 254 is provided with a shaft 256 which is mounted in suitable bearings 257 and 258 carried by the upper and lower frame members.

The conveyer belt, after passing around the barrel pulley 254, and being turned into a vertical plane, passes through suitable vertical idlers 261 which are mounted in a frame 262, supported by roof jacks 263 in the manner already described. The lower edges of the belt pass over short horizontal idlers 264. As will be noted in Fig. 20, the idler frame 262 with its idlers is laterally displaced with respect to the barrel pulley 254. This is for the reason that with the elongated frame of the transfer section, it is necessary to displace the take up section of the belt laterally in order to clear the wall of the working, indicated at 266.

The return flight 267 of the take-up section of the conveyer belt passes by a vertical idler 268 mounted in the frame between the upper and lower members 226 and 227 and thence around a return barrel shaped idler 269 mounted in bearings 271 and 272 in the upper and lower members of the frame. From the barrel shaped idler 269, the return flight 267 passes to a horizontally disposed idler, not shown, and is turned from the vertical to a horizontal position, as in the previously described embodiment.

Figures 22, 23:
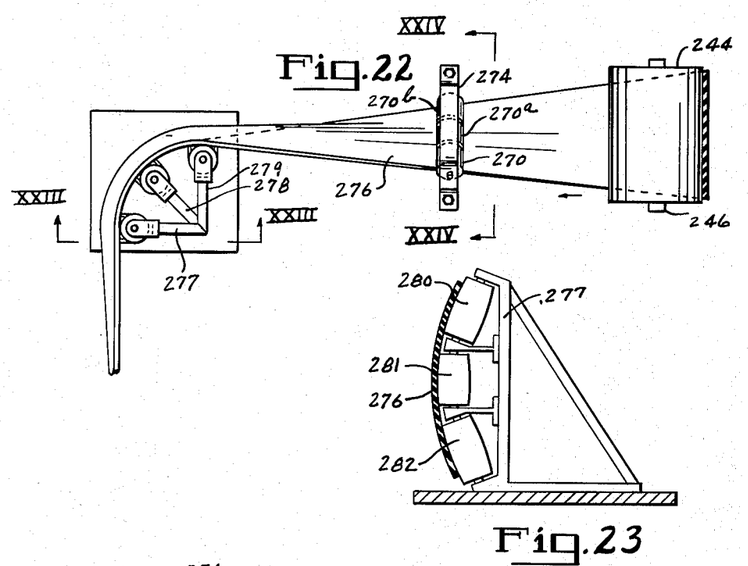
Fig. 22 is a detail plan view showing a further modified form of idler pulleys for turning the conveyor belt from a horizontal to a vertical plane.
Fig. 23 is a detail sectional elevation taken on line XXIII—XXIII of Fig. 22, drawn to a larger scale, and showing the last of the idlers over which the belt passes; and, Fig. 24 is a sectional elevation taken on the line XXIV—XXIV of Fig. 22.
Figure 24:
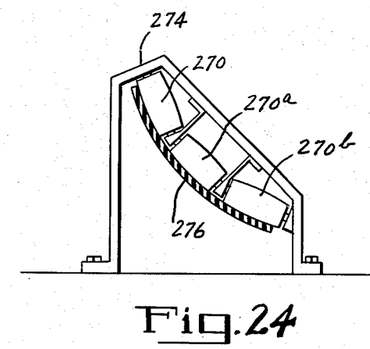

In Figs. 22 to 24 inclusive I show diagrammatically an arrangement of idler pulleys disposed to turn the conveyer belt from horizontal to vertical, or from vertical to horizontal, as the case might be. In this modification, it will be understood that the idlers shown will be mounted in an elongated frame such as shown in Figs. 20 and 21. In accordance with this modification, the conveying belt, after passing around the pulley 244 passes next under a set of inverted troughing rollers 270, 270a and 270b which are mounted in a supporting bracket 274 suitably supported in the transfer section frame. It will be noted that the idlers 270, 270a and 270b are so disposed as to present a convex surface to the flight 276 of the belt. It will also be noted in Fig. 24, that the angularity of the idler rollers 270, 270a and 270b, with respect to the horizontal, is generally 45°.

After passing the idlers 270, 270a and 270b, instead of passing around a barrel shaped idler, such as the idler 254 in Fig. 20, I provide three idler supporting brackets 277, 278 and 279 disposed approximately 45° apart, as shown in Fig. 22 and each supporting inverted troughing idlers 280, 281 and 282 as shown in Fig. 23; that is, the three idlers presenting a convex surface to the conveyor belt 276. The three idler supports 277, 278 and 279 with their idlers thus form, in effect, a section of a barrel shaped pulley as may be seen by a consideration of Figs. 22 and 23. Although only one flight, or reach, of the conveyor belt is shown in Figs. 22 to 24, it will be understood that the return flight of the belt may be similarly turned from a vertical to a horizontal position or from a horizontal to a vertical position.

With the modified form of transfer section illustrated in Figs. 20 to 24 inclusive, it is contemplated that when moving from one location in a mine to another, the conveyor belt will not be disconnected, as hereinbefore described, and the transfer section frame will be turned on its base 233 to a position where it may clear the sides of the working, and will be skidded from place to place on the skid base 233. In operation the conveyor belt is supported upon idlers carried in frames which are in turn held in place by roof jacks, as hereinbefore described. The idler frames are preferably connected together by extensible means such as the folding gate, or lazy tong construction shown in Figs. 18 and 19. In all other respects, this modification of the invention is operated in the same manner as other forms hereinbefore described.

From the foregoing it will be apparent that I have devised an improved conveying system which is adapted for continuous operation following a continuous mining machine which is flexible, easily manipulated and simple and sturdy of design.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In an extensible belt conveyor including a conveying section, a take up section and means to discharge material from the conveyor intermediate the conveying and the take up section, propulsion power means at the outer end of the conveying section, means to drive the conveyor belt from the propulsion power means, means at the outer end of the take up section for maintaining tension in the belt, troughing idlers at intervals for the upper reach of the belt in the conveying section, means to turn the reaches of the belt in the take up section to travel in vertical planes and vertical idlers for both reaches of the belt in the take up section.

2. In an extensible belt conveyor including a conveying section, a transfer section and a take up section, propulsion power means at the outer end of the conveying section, means to drive the conveyor belt from the propulsion power means, means at the outer end of the take up section for maintaining tension in the belt, troughing idlers at intervals for the upper reach of the belt in the conveying section, means to turn the reaches of the belt in the take up section to travel in vertical planes, vertical idlers for both reaches of the belt in the take up section, the positions of all the idlers being adjustable longitudinally of the belt.

3. In an extensible belt conveyor including a coneying section, a transfer section and a take up section, propulsion power means at the outer end of the conveying section, means to drive the conveyor belt from the propulsion power means, means at the outer end of the take up section for maintaining tension in the belt, troughing idlers at intervals for the upper reach of the belt in the conveying section, means to turn the reaches of the belt in the take up section to lie in a vertical plane, vertical idlers for both reaches of the belt in the take up section, the positions of all the idlers being adjustable longitudinally of the belt, supporting means for the idlers disposed alongside the belt, and means for maintaining the supporting means for the troughing idlers in alignment.

4. In an extensible belt conveyer apparatus including a conveying section, a transfer section and a take up section, a head pulley at the outer end of the conveying section, a tail pulley at the outer end of the take up section, power propulsion means upon which the head pulley is mounted and including means for driving the head pulley, other power propulsion means upon which the tail pulley is mounted, and means included in said last mentioned power propulsion means for maintaining tension on the belt.

5. In an extensible belt conveyer apparatus including a conveying section, a transfer section and a take up section, a head pulley at the outer end of the conveying section, a tail pulley at the outer end of the take up section, power propulsion means upon which the head pulley is mounted, power propulsion means upon which the tail pulley is mounted, and a plurality of idler supports along the conveyer belt in the conveying section and in the take up section, the position of each of which is adjustable with respect to the conveyer belt.

6. Apparatus as defined in claim 5 in which the propulsion means at both ends of the belt are each provided with endless tracks and the transfer section is self propelled and is also provided with endless tracks.

7. Apparatus as defined in claim 5 in which the idlers are supported by movable vertical members mounted alongside the conveyer belt together with means for securing them at top and bottom.

8. In an extensible belt conveying apparatus including a conveying section, a take up section, and a transfer section interposed between the conveying section and the take up section and effective to control movements of the reaches of the belt between the conveying section and the take up section, said transfer section including pulleys effective to turn the reaches of the belt from horizontal to vertical and back to horizontal, a rail track for the conveying section, a second rail track for the take up section angularly disposed with respect to the track for the conveying section, idler support carriages mounted to travel on both rail tracks, a switch connecting the track for the conveying section to the track for the take up section and around which the said carriages are adapted to move, vertically disposed idlers on the carriages for the belt while in the take up section, troughing idlers for the conveying section of the belt, releasable means for holding the vetrically disposed idlers, and trip means disposed adjacent the switch in the track for releasing the releasable means as the carriages approach the switch moving toward the conveying section.

9. In an extensible belt conveying apparatus including a conveying section, a take up section, and a transfer section interposed between the conveying section and the take up section and effective to control movements of the reaches of the belt between the conveying section and the take up section, said transfer section including pulleys effective to turn the reaches of the belt from horizontal to vertical and back to horizontal, a rail track for the conveying section, a second rail track for the take up section angularly disposed with respect to the track for the conveying section, idler support carriages mounted to travel on both rail tracks, a switch connecting the track for the conveying section to the track for the take up section and around which the said carriages are adapted to move, vertically disposed idlers on the carriages for the belt while in the take up section, troughing idlers for the conveying section of the belt, releasable means for holding the vertically disposed idlers, trip means disposed adjacent the switch in the track for releasing the releasable means as the carriages approach the switch moving toward the conveying section, a head pulley for the conveying section, a locomotive adapted to travel on the rails and on which the head pulley is mounted, said locomotive being adapted to pull the conveying section and the idler support carriages outwardly with respect to the transfer section, a plate included in the track between the conveying section and the transfer section and having grooves therein for guiding the wheels of the idler support carriages, and idlers underneath the plate for the return reach of the conveying belt.

10. In an extensible belt conveyer apparatus including a conveying section, a transfer section and a take up section, a head pulley at the outer end of the conveying section, a tail pulley at the outer end of the take up section, power propulsion means upon which the head pulley is mounted including means for driving the head pulley, other power propulsion means upon which the tail pulley is mounted, means included in said last mentioned power propulsion means for maintaining tension on the belt, and means for moving the transfer section from place to place.

11. In an extensible belt conveyer apparatus including a conveying section, a transfer section and a take up section, a head pulley at the outer end of the conveying section, a tail pulley at the outer end of the take up section, power propulsion means upon which the head pulley is mounted including means for driving the head pulley, other power propulsion means upon which the tail pulley is mounted, means included in said last mentioned power propulsion means for maintaining tension on the belt, and power propulsion means included in the transfer section for moving it from place to place.

12. In a mobile extensible conveyer apparatus including a conveying section, a belt twisting section and a take up section operable as a surplus belt-reservoir from which belt may be fed into the conveying section, a head pulley at the outer end of the conveying section, a discharge pulley terminal at the inner end of the conveying section, pulleys included in the belt twisting section operable to twist the two strands of belt transversely from the horizontal into the vertical plane and back again into the horizontal plane, a vertical tail pulley at the outer end of the take up section, propulsion power means at the outer end of the conveying section including means to drive the head pulley, other power propulsion means at the outer end of the take up section, each operable from common power controls to move synchronously, to extend the length of the conveying section to any predetermined proportion of the take up section or conversely to shorten the conveying section and lengthen the take up section, said propulsion means being operable to move the assembled apparatus while not conveying from place to place as an integrated system, ready to resume conveying.

13. In an extensible belt conveyer apparatus including a conveying section, a transfer section and a take up section, a head pulley at the outer end of the conveying section, a tail pulley at the outer end of the take up section, power propulsion means connected to said head pulley, means for driving the head pulley, other power propulsion means connected to the tail pulley, and means included in said last mentioned power propulsion means for maintaining tension on the belt.

14. In an extensible belt conveyer apparatus including a conveying section, a transfer section and a take up section, a head pulley at the outer end of the conveying section, a tail pulley at the outer end of the take up section, power propulsion means connected to said head pulley, other power propulsion means connected to the tail pulley, and a plurality of idler supports along the conveyer belt in the conveying section and in the take up section, the position of each of which is adjustable with respect to the conveyer belt.

References Cited in the file of this patent

UNITED STATES PATENTS

| | | |
|---|---|---|
| 571,604 | Robins | Nov. 17, 1896 |
| 642,175 | Titus | Jan. 30, 1900 |
| 902,421 | Liggett | Oct. 27, 1908 |
| 1,858,933 | Miller | May 17, 1932 |
| 1,920,500 | Garcia et al. | Aug. 1, 1933 |
| 1,935,734 | Twomley | Nov. 21, 1933 |
| 2,169,890 | Zink | Aug. 15, 1939 |
| 2,514,715 | Milik | July 11, 1950 |
| 2,561,708 | Milik | July 24, 1951 |